US008140849B2

(12) United States Patent
Rodriguez et al.

(10) Patent No.: US 8,140,849 B2
(45) Date of Patent: Mar. 20, 2012

(54) SECURITY FOR NETWORK CODING FILE DISTRIBUTION

(75) Inventors: Pablo Rodriguez Rodriguez, Cambridge (GB); Christos Gkantsidis, Cambridge (GB); Stephane Ubeda, Lyons (FR)

(73) Assignee: Microsoft Corporation, Redmond, WA (US)

( * ) Notice: Subject to any disclaimer, the term of this patent is extended or adjusted under 35 U.S.C. 154(b) by 1472 days.

(21) Appl. No.: 11/191,761

(22) Filed: Jul. 28, 2005

(65) Prior Publication Data

US 2006/0282677 A1  Dec. 14, 2006

Related U.S. Application Data

(63) Continuation-in-part of application No. 11/152,754, filed on Jun. 13, 2005, now Pat. No. 7,756,051.

(60) Provisional application No. 60/585,212, filed on Jul. 2, 2004.

(51) Int. Cl.
    *G06F 21/00* (2006.01)
(52) U.S. Cl. .......... 713/176; 713/163; 726/23; 380/234; 709/239
(58) Field of Classification Search .................. 713/176
    See application file for complete search history.

(56) References Cited

U.S. PATENT DOCUMENTS

| | | | |
|---|---|---|---|
| 6,404,814 B1 | 6/2002 | Apostolopoulos et al. | |
| 6,639,954 B2 | 10/2003 | Koruiwa et al. | |
| 6,760,479 B1 | 7/2004 | Feria | |
| 6,765,967 B2 | 7/2004 | Dowling | |
| 6,775,325 B1 | 8/2004 | Florencio | |
| 6,944,226 B1 | 9/2005 | Lin et al. | |
| 6,947,933 B2 * | 9/2005 | Smolsky | 707/6 |
| 7,082,220 B2 | 7/2006 | Kondo et al. | |
| 7,159,116 B2 * | 1/2007 | Moskowitz | 713/176 |
| 7,197,084 B2 | 3/2007 | Ketchum et al. | |

(Continued)

FOREIGN PATENT DOCUMENTS

EP    1427170    6/2004

(Continued)

OTHER PUBLICATIONS

Fridrich et al., Robust hash functions for digital watermarking, Information Technology: Coding and Computing, 2000, pp. 178-183.*

(Continued)

*Primary Examiner* — Taghi Arani
*Assistant Examiner* — Morshed Mehedi

(57) ABSTRACT

A content distribution mechanism that relies on cooperative desktop PCs to distribute content is disclosed. The mechanism distributes content in a robust manner by allowing at least one intermediate network node (i.e., between a source and client) to generate and send packets that contain a linear combination of the portions of content available at the node. Such linear combinations may be created by the source and client using at least a portion of the original content file in either encoded or unencoded form. After the client has received enough linearly independent combinations of packets, the original content may be reconstructed. Further, security for network coding file distribution may be employed to maintain the efficiency and security of the content distribution mechanism. A security server may generate security information using a hashing algorithm including the property of producing security information for each block which survives the process of creating encoded blocks. The security server may generate a unique set of security information for each node participating in the content distribution which each node may then use to verify that the blocks being examined are valid and were created from a linear combination of the original blocks of the file.

18 Claims, 9 Drawing Sheets

U.S. PATENT DOCUMENTS

| | | | |
|---|---|---|---|
| 7,203,893 B2 | 4/2007 | Kerr et al. | |
| 7,277,950 B1 | 10/2007 | Chapweske | |
| 7,334,051 B2* | 2/2008 | Koyata et al. | 709/246 |
| 7,366,660 B2 | 4/2008 | Kondo et al. | |
| 7,418,110 B2 | 8/2008 | Lubin et al. | |
| 7,668,712 B2 | 2/2010 | Wang et al. | |
| 7,756,051 B2 | 7/2010 | Rodriguez et al. | |
| 2002/0146123 A1* | 10/2002 | Tian | 380/234 |
| 2003/0084284 A1* | 5/2003 | Ando et al. | 713/163 |
| 2003/0152165 A1* | 8/2003 | Kondo et al. | 375/316 |
| 2003/0208761 A1* | 11/2003 | Wasserman et al. | 725/53 |
| 2004/0107347 A1* | 6/2004 | Ogino | 713/176 |
| 2004/0111608 A1* | 6/2004 | Oom Temudo de Castro et al. | 713/156 |
| 2004/0128511 A1* | 7/2004 | Sun et al. | 713/176 |
| 2005/0010675 A1 | 1/2005 | Jaggi et al. | |
| 2005/0050332 A1* | 3/2005 | Serret-Avila et al. | 713/176 |
| 2005/0149727 A1* | 7/2005 | Kozat et al. | 713/165 |
| 2005/0216473 A1* | 9/2005 | Aoyagi et al. | 707/10 |
| 2006/0112264 A1* | 5/2006 | Agarwal | 713/150 |
| 2007/0041447 A1* | 2/2007 | Burazerovic et al. | 375/240.18 |

FOREIGN PATENT DOCUMENTS

JP 2002-223167 8/2002

OTHER PUBLICATIONS

Bojkovic et al, "Multimedia contents security: watermarking diversity and secure protocols", Telecommunications in Modern Satellite, Cable and Broadcasting Service, 2003. TELSIKS 2003. 6th International Conference on (0-7803-7963-2) 2003. vol. 1;p. 377-383 vol. 1.*
Koetter, et al.; "Beyond Routing: An Algebraic Approach to Network Coding"; IEEE Infocom 2002.
Rejaie et al.; "A Framework for Architecting Peer-to-Peer Receiver-driven Overlays"; Nossdav 04, Ireland, Jun. 2004.
Jain, et al.; "Building scalable and robust peer-to-peer overlay networks for broadcasting using network coding"; Under Submission to ACM-SIAM (SODA 05). Jul. 2005.
Chou, et al.; "Network coding for the Internet"; IEEE Communication Theory Workshop, Italy, May 2003.
Zhu, et al.; "Multicast with Network Coding in Application-Layer Overlay Networks"; IEEE Journal on Selected Areas in Communications; Jan. 2004.
Chou, et al.; "Practical network coding"; Allerton Conference on Communications, Control, and Computing; Monticello, IL, Oct. 2003.
Li, et al.; "On Achieving Optimal End-to-End Throughput in Data Networks: Theoretical and Empirical Studies"; ECE Technical Report, University of Tornto; Feb. 2004.
Ahlswede et al.; "Network Information Flow"; IEEE Transactions on Information Theory; Jul. 2000.
Castro, et al.; "SplitStream: High-Bandwidth Multicast in Cooperative Environments"; Proc. of the 19th ACM Symposium on Operating Systems Principles (SOSP); Oct. 2003.
Padmanabhan, et al.; "Distributing Streaming Media Content Using Coperative Networking"; Proc. of NOSSDAV 2002; May 2002.
Byers, et al.; "Informed Content Delivery Across Adaptive Overlay Networks"; Proc. of ACM SIGCOMM; Aug. 2002.
Kostic, et al.; "Bullet: High Bandwidth Data Dissemination Using an Overlay Mesh"; Proc. of the 19th ACM Symposium on Operating Systems Principles (SOSP 2003); 2003.
Francis, Paul; "Yoid: Extending the internet multicast architecture"; Unpublished paper; Apr. 2000.
Chu, et al.; "A Case for End System Multicast"; Proceedings of ACM Sigmetrics; Santa Clara, Currently Amended; Jun. 2000; pp. 1-12.
Goyal, Vivek; "Multiple Description Coding: Compression Meets the Network"; IEEE Signal Processing Magazine; May 2001.
Cohen, Bram; "Incentives build robustness in BitTorrent"; P2P Economics Workshop; 2003.
Sherwood, et al.; "Slurpie: A Cooperative Bulk Data Transfer Protocol"; IEEE Infocom; Mar. 2004.
Rodriguez, et al.; "Dynamic Parallel-Access to Replicated Content in the Internet"; IEEE Transactions on Networking; Aug. 2002.
Byers, et al.; "Accessing Multiple Mirror Sites in Parallel: Using Tornado Codes to Speed Up Downloads"; Infocom; 1999.
Izal, et al.; "Dissecting BitTorrent: Five Months in a Torrent's Lifetime"; Passive and Active measurements 2004; Apr. 2004.
Qiu, et al.; "Modeling and Performance Analysis of BitTorrent-Like Peer-to-Peer Networks"; to appear in SIGCOMM 2004.
Byers, et al.; "A Digital Fountain Approach to Reliable Distribution of Bulk Data"; SIGCOMM, 1998.
Maymounkov, et al.; "Rateless Codes and Big Downloads"; IPTPS '03; Feb. 2003.
Jain, et al.; "Packing Steiner Trees"; Proceedings of the 7th Annual ACM-SIAM Symposium on Discrete Algorithms (SODA); 2003.
Robins, et al.; "Improved Steiner Tree Approximation in Graphs"; Proceedings of the 7th Annual ACM-SIAM Symposium on Discrete Algorithms (SODA); 2000.
Thimm, Martin; "On the Approximability of the Steiner Tree Problem"; Mathematical Foundations of Computer Science 2001; Springer LNCS; 2001.
Ho, et al.; "The Benefits of Coding over Routing in a Randomized Setting"; ISIT; Yokohama, Japan; 2003.
Pandurangan, et al.; "Building Low-diameter P2P Networks"; 42nd Annual Symposium on Foundations of Computer Science (FOCS01); pp. 492-499; 2001.
Krohn, et al.; "On-the-Fly Verification of Rateless Erasure Codes for Efficient DContent Distribution"; IEEE Symposium on Security and Privacy; Berkeley, CA; 2004.
Adar, et al.; "Free Riding on Gnutella"; First Monday; Available at: www.firstmonday.dk/issues/issue5 10/adar/; 2000.

* cited by examiner

200

500

SECURITY FOR NETWORK CODING FILE DISTRIBUTION

CROSS-REFERENCE TO RELATED APPLICATIONS

This application is a continuation-in-part of U.S. application Ser. No. 11/152,754 filed Jun. 13, 2005, now U.S. Pat. No. 7,756,051 which claims the benefit of U.S. provisional Application No. 60/585,212, filed Jul. 2, 2004.

BACKGROUND

In today's networked computing environments, it is often necessary or desirable to provide large-scale content delivery to nodes in a network. One mechanism used for large-scale content delivery is a content distribution system using network coding. In general, a content distribution system is a network of interconnected cooperative nodes using network coding to distribute any type of digital content from a source to one or more of the interconnected cooperative nodes. Typical content distribution systems first have to construct an efficient overlay topology and then schedule the transmittal of information across that topology such that all nodes share the distribution effort evenly.

Several factors may affect the efficiency of typical content distribution systems. First, the efficiency of a typical content distribution system may decrease as the number of nodes in the overlay topology increases. Second, the efficiency of a typical content distribution system may decrease as the network becomes more heterogeneous, particularly with respect to the bandwidth capabilities of each individual node. Third, the efficiency of a typically content distribution may decrease as processing overhead is added to implement incentive mechanisms designed to prevent or minimize 'leeching' nodes. Leeching nodes are nodes that do not cooperate on the network and are modified so as to act only as receivers on the network, thus increasing their download speed.

SUMMARY

This summary is provided to generally introduce, in a simplified form, the reader to one or more select concepts described below in the detailed description. This summary is not intended to identify key and/or required features of the claimed subject matter, nor is it intended to be used as an aid in determining the scope of the claimed subject matter.

Disclosed herein are various technologies for providing fast and scalable content distribution in a content distribution network.

In accordance with some of the technologies described herein, digital content (e.g., a file) may first be divided into N blocks of content, which may or may not be encoded. One or more of the N blocks may then be distributed among nodes cooperating on the network.

The distributed blocks of content at any of the cooperating nodes of the Content Distribution Network may be encoded into encoded data packets. The encoded data packets at a cooperating node of the Content Distribution Network may contain information about the distributed blocks of content received at that particular cooperating node. Further, the encoded data packets at that particular cooperating may also contain information about other encoded data packets. Thus, an encoded data packet may be used in place of any distributed of the N blocks of content when reconstructing the digital content at a downstream receiving node.

That is, a client seeking to download at least a copy of the digital content divided into N blocks of content would download N encoded representations of the N blocks from random ones of the cooperating nodes of the Content Distribution Network, rather than being required to locate and download each of the original N blocks of content from either the source node or any combination of the nodes of the network.

The cooperating nodes in the Content Distribution Network may trust the source of the file because, for example, a cooperating node may have verified the trustworthiness of the source before deciding to retrieve the digital content. However, in the Content Distribution Network, the cooperating nodes may not trust one another, and in addition, the cooperating nodes may not be aware of other cooperating nodes in the Content Distribution Network due to issues of network topology as well as the transitory nature of cooperating nodes entering and exiting the Content Distribution Network.

Also in accordance with some of the technologies described herein, the blocks, whether encoded or unencoded, may be verified to ensure that blocks are genuine and represent the digital content (e.g., a file). In addition, the cooperative nodes may employ a system of alerts to notify other cooperative nodes in the Content Distribution Network that a problem has been detected with regard to the encoded blocks.

Malicious nodes may seek to disrupt or delay distribution of the digital content through the Content Distribution Network. These malicious nodes may employ a variety of techniques to accomplish the disruption or delay of the distribution of the digital content, for example, by creating encoded blocks which are not representative of the original digital content and distributing those encoded blocks into the Content Distribution System. The Content Distribution System may make use of several techniques to defeat the malicious node or nodes and allow the distribution of the digital content to continue.

DESCRIPTION OF THE DRAWINGS

The present description will be better understood from the following detailed description read in light of the accompanying drawings.

DETAILED DESCRIPTION

Figure 1:
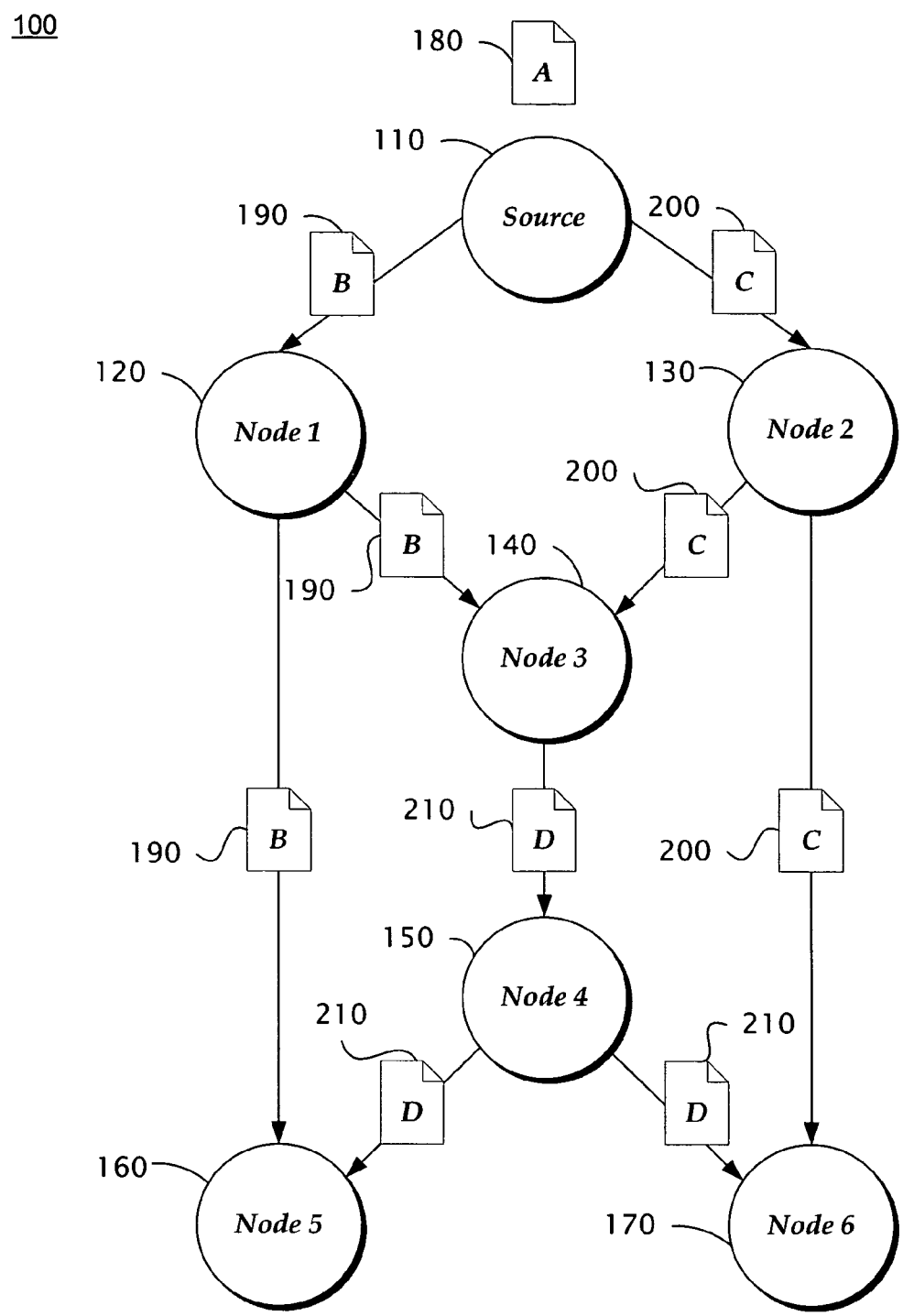
FIG. 1 shows a content distribution network environment in which examples of content distribution using network coding may be implemented.

Disclosed herein are various technologies for facilitating the delivery of digital content in a computer network.

In accordance with various embodiments described herein, a source node storing a file or piece of digital content to be shared among receiving nodes may communicate with a management service on the network to announce that the file or piece of digital content is available. Before commencing downloading or distributing the file or piece of digital content, the source node of the file or piece of digital content may divide the file or piece of digital content into a predetermined number of blocks of a predetermined size and provide that information any one of a management service on the network, a different service on the network, receiving nodes on the network that may download the content, or to any node on the network that may otherwise find the content useful.

Once the source node has announced that the file or piece of digital content is available for download or distribution, a receiving node on the network may communicate with the management service and select the file or piece of digital content for download. In at least one implementation of content distribution using network coding, when the receiving node has selected the file or piece of digital content to download, the receiving node may communicate with the management service on the network to learn of other receiving nodes that are to receive at least portions of the distributed file or piece of digital content from the source node.

When the source node has completed dividing the file or piece of original digital content into the predetermined number of blocks, the source node may then encode the blocks by choosing a set of mathematical modifiers in accordance with a mathematical system that has been chosen to encode the blocks. This chosen mathematical system may treat the blocks, the file, or piece of digital content as variables in an equation and may further treat the encoded block as the solution to the equation. Unencoded blocks may also be used in the same manner, and may also be included equally in the mathematical system with encoded blocks. For example, unencoded blocks may be considered to be a linear combination of the original block and no other blocks. Further, the source node may choose to encode only specific regions of the file and leave other regions unencoded.

Thus, once a receiving node has received enough encoded or unencoded blocks and their corresponding mathematical modifiers, the receiving node may solve the system of equations to learn the value of the variables (i.e., the blocks). Any mathematical system with the properties disclosed herein may be used, and therefore the implementations described herein are not so limited.

When the source node has encoded at least one block of the original digital content, the source node may begin distributing the one or more blocks to receiving nodes. In at least one alternative implementation of content distribution using network coding, a receiving node may not send a request for a specific block, but rather the receiving node may send a request to receive the set of mathematical modifiers. Further, once the receiving node has received the requested mathematical modifiers, the receiving node may then perform a calculation in accordance with the mathematical system to determine whether the mathematical modifiers provide additional information helpful to solving the mathematical system. Finally, upon determining the mathematical modifiers contain information helpful in solving the mathematical system, the receiving node may send a request to the source node to send the encoded block corresponding to the set of mathematical modifiers.

Additionally, in at least one other implementation of content distribution using network coding, once a receiving node has received any number of blocks, the receiving node may then act as a sending node functioning similarly to the source node in the content distribution network. For example, upon receiving requests from other receiving nodes, the receiving may serve as a source node by re-encoding blocks at the receiving node in manner similar to that used by the source node to originally encode the blocks.

Upon receiving a minimum number of blocks and mathematical modifiers, a receiving node may begin solving the mathematical system to decode the received blocks. Solving of the mathematical system may begin using any mixture of encoded or unencoded blocks, and may begin before the full set of blocks has been received. Once the blocks have been decoded to reproduce the original blocks, the receiving node may combine the decoded blocks to create a copy of the original file or piece of digital content.

In at least one other implementation of content distribution using network coding, a security server may be added to defeat malicious nodes that may be present in the network. Such malicious nodes may seek to disrupt or delay the propagation of both unencoded and encoded blocks in the content distribution network by implementing, e.g., an entropy attack, a jamming attack, or a denial of service attack within the content distribution using network coding system.

In an entropy attack, a malicious node may encode and distribute blocks that are linearly dependent from other unencoded or encoded blocks that are stored locally. In creating linearly dependent blocks, the malicious node reduces the diversity of blocks in the content distribution using network coding system, and, in doing so, makes it more difficult for other cooperative nodes to locate encoded or unencoded blocks that contain information useful for decoding the original set of blocks. Since the cooperative nodes in the content distribution using network coding system may determine the linear independence of an unencoded or encoded block by receiving only the mathematical modifiers and not the unencoded or encoded block itself, cooperative nodes may inherently defeat such an attack by not requesting the malicious node send the unencoded or encoded blocks determined to be linearly dependent.

In a jamming attack, a malicious node may create an invalid encoded block using information not related to the original blocks of the digital content, yet generate a set of mathematical identifiers that indicate the block is linearly independent to a querying cooperative node. Thus, the malicious node may entice the cooperative node into downloading an encoded block that is not usable in decoding the original blocks. The cooperative node may then use the invalid encoded block when the cooperative node produces subsequent encoded blocks which may result in each of the subsequent encoded blocks also being invalid. If the cooperative node should then share those blocks with other cooperative nodes which in turn may create subsequent encoded blocks, those subsequent encoded blocks may also be invalid. The insertion of a single bogus encoded block into the content distribution using network coding system may result in a large number of invalid blocks.

According to at least one example implementation, a jamming attack may be defeated by employing a security server which generates a set of security parameters and a hash of the file or piece of digital content. A hashing function H may have the properties of being collision-resistant (i.e., finding two elements x and y where x≠y and H(x)=H(y) is a complex calculation which may difficult to solve) and homomorphic (i.e., for any two elements x and y, $H(x) \times H(y) = H(x+y)$, or, i.e., for any two elements x and y, $H(x+y) = H(x) + H(y)$).

When a cooperative node joins the content distribution using network coding system, the cooperative node may download a hash of the entire file or piece of digital content and a set of security parameters corresponding to the blocks of the file or piece of digital content. The security parameters may be uniquely generated for each new cooperative node that enters the content distribution using network system.

Once a cooperative node has received either an unencoded or encoded block and a set of mathematical modifiers from another cooperative node in the content distribution using network coding system, the cooperative node may use the hashing function H to calculate the actual hash of the unencoded or encoded block, and then may further calculate the expected hash of the unencoded or encoded block by performing the hashing function using the security parameters and the mathematical modifiers. If the actual hash of the unencoded or encoded block is equal to the expected hash, the validity of the unencoded or encoded block has been verified.

A cooperative node may reduce the amount of time the cooperative node spends verifying blocks by using one or more of the following techniques.

For example, a cooperative node may not check each unencoded or encoded block which it may receive as the cooperative node may choose to verify blocks at a regularly timed interval or when a set number of unencoded or encoded blocks have been received. In addition, a cooperative node may not check each unencoded or encoded block it may receive as the work of verifying unencoded or encoded blocks may be shared among the cooperative nodes of the network and the discovery of invalid blocks is communicated using a system of alerts.

Further, according to at least one example implementation, a cooperative node may track which unencoded or encoded blocks have been checked. For example, a cooperative node may employ a secure window to store valid encoded or unencoded blocks and an insecure window to store encoded or unencoded blocks which have not been validated.

In addition, according to at least one example implementation, a cooperative node may check a batch of unencoded or encoded blocks in the insecure window. The cooperative node may check a batch of unencoded or encode blocks by creating a new encoded block from a linear combination of the set of unencoded or encoded blocks stored in the insecure window. The method described above with reference to verifying the validity of a single block may then be applied to the new encoded block and the new set of random mathematical identifiers. If the new encoded block is determined to be invalid, this is an indication that at least one of the unencoded or encoded blocks in the set of unencoded or encoded blocks is invalid.

Once the cooperative node has determined one or more unencoded or encoded blocks are invalid, the cooperative node may wish to discover the identify of the one or more invalid unencoded or encoded blocks stored in the insecure window. A cooperative node may reduce the time taken to discover the identity of the one or more invalid unencoded or encoded blocks by using a binary search to discover the identity of the one or more invalid unencoded or encoded blocks.

For example, the set of unencoded or encoded blocks in the insecure window may be divided into two sets of unencoded or encoded blocks, and the method described above with respect to verifying the validity of a batch of unencoded or encoded blocks may be performed on each of the two sets to produce a new encoded block for each of the two sets. If one of the new encoded blocks is determined to be valid, the unencoded or encoded blocks in that set are all valid and may be moved to the secure window. The remaining set of unencoded or encoded blocks may then be divided again and the method repeated until all the invalid blocks have been discovered.

The encoding and re-encoding of the original blocks of the file or piece of digital content and the distribution of those blocks suggests that a malicious node could quickly propagate invalid information throughout the Content Distribution Network. According to at least one example implementation, cooperative nodes may employ a system of alerts to communicate to other cooperative nodes with which it has been exchanging unencoded or encoded blocks that an invalid block has been discovered and the other cooperative nodes may have stored invalid blocks, created invalid encoded blocks, and distributed those invalid encoded blocks to other cooperative nodes.

For example, a cooperative node may maintain a list corresponding to the unencoded or encoded blocks in the insecure window, the list recording the source node of received unencoded or encoded blocks and the recipient nodes of encoded blocks produced on the cooperative node. If an invalid unencoded or encoded block is discovered in the insecure window, the cooperative node may then utilize the list to send an alert to the source node of the invalid unencoded or encoded block as well as send an alert to any other cooperative node that has received an encoded block created from the set of unencoded or encoded blocks in the insecure window.

This may decrease the amount of time each cooperative node utilizes to verify unencoded or encoded blocks. Each cooperative node may trust that other cooperative nodes are sharing the work of verifying unencoded or encoded blocks and will alert the cooperative node if an invalid unencoded block is discovered in Content Distribution System.

Once a cooperative node has received an alert, it may then place the unencoded or encoded blocks stored in the insecure window in quarantine and undertake checking the unencoded or encoded blocks that have been placed in quarantine. The node may also stop using the unencoded or encoded blocks in its insecure window to create new encoded blocks that it distributes to other cooperative nodes.

However, a malicious node may utilize the alert system to perform a denial of service attack in which the malicious node sends alerts to cooperative nodes in the content distribution using network coding system when no alert is necessary in order to force the cooperative nodes to undertake the operations described above unnecessarily.

In at least one example implementation, this denial of service attack may be defeated by the cooperative node in the content distribution using network coding system verifying the validity of the alert before undertaking any action. The alert may be verified using a method similar to the method described above for batch checking unencoded or encoded blocks in the insecure window or using any method that produces the result of verifying the validity of the alert.

FIG. 1 shows example Computer Network 100, including multiple interconnected network nodes, in which one or more examples of content distribution using network coding may be implemented.

As used herein, the term "node" may refer to any computer system, device, or process that is uniquely addressable, or otherwise uniquely identifiable, in Network 100, and that is operable to communicate with other nodes on Network 100. For example, and without limitation, a node may be a personal computer, a server computer, a hand-held or laptop device, a tablet device, a multiprocessor system, a microprocessor-based system, a set top box, a consumer electronic device, a network PC, a minicomputer, a mainframe computer, a distributed computing environment that includes any of the above systems or devices, or the like.

In cases where a node on Network 100 comprises a computer system or processing device of some form, the node may typically include a processor, one or more forms of computer-readable media, and one or more communications connections, which allow the node to operatively connect to Network 100. As used herein, computer-readable media may be any media that can store or embody information that is encoded in a form that can be accessed and understood by a computer. Typical forms of computer-readable media include, without limitation, both volatile and nonvolatile memory, data storage devices including removable and/or non-removable media, and communications media.

Communication media may embody computer-readable information in a modulated data signal, such as a carrier wave or other transport mechanism, and may include any information delivery media. The term "modulated data signal" may refer to a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The functionality that is described herein with respect to a particular node on Network 100 may be implemented by the node itself, by the node in cooperation with one or more modules that may be included in or otherwise associated with the node, or by a number of sub-modules. For example, in at least one implementation of content distribution using network coding, operations performed by a node or module on Network 100 may be implemented as computer-executable instructions that are embodied in one or more computer-readable media. In these implementations, the operations of the node or the module may be executed by a processor or processors in the node in which the module is included or associated. In other implementations, the operations of a node may be implemented as hardware, firmware, or some combination of hardware, firmware, and software, either as a part of, or in some other way associated with, the node in which the module is included or associated. Furthermore, the functionality that is described herein with respect to a particular node may be carried out by, or distributed across, a number of nodes.

Content distribution using network coding may be further explained, with reference to FIG. 1, by considering an example implementation in which Source 110 is to distribute Content A 180 to participating nodes over Network 100. Although Content A 180 may be any type or size of file, for the purposes of this example assume Content A 180 is composed only of two digital bits, which include a binary digit 0 and a binary digit 1.

According to at least one example implementation, Source 110 may divide Content A 180 into Block B 190 containing a binary digit 0 and Block C 200 containing a binary digit 1. Further, Source 110 may send Block B 190 to Node 1 120, and may also send Block C 200 to Node 2 130. Node 1 120 may forward Block B 190 to Node 3 140 as well as to Node 5 160. Node 2 130 may forward Block C 200 to Node 3 140 as well as to Node 6 170.

Having received Block B 190 and Block C 200, Node 3 140 may then weigh the efficiency of forwarding, to Node 4 150, Block B 190 against Block C 200. This efficiency determination may take into consideration that Node 3 140 may have no knowledge of any other node to which Node 4 150 may be connected or of any data that the nodes to which Node 4 150 is connected may require in order to reconstruct Content A 180.

An example scenario resulting from the aforementioned efficiency determination may contemplate Node 3 140 sending Block B 190 to Node 3 140. Node 4 150 may then be able to forward useful information only to Node 6 170, and Node 5 160 may have to wait to receive Block B 190 in order to reconstruct Content A 180. Another example scenario may contemplate Node 3 140 sending Block C 200 to Node 4 150. Node 4 150 may then be able to forward useful information only to Node 5 160, and Node 6 170 may have to wait to receive Block B 190, in order to reconstruct Content A 180.

However, at least one implementation of content distribution using network coding includes Node 3 140 encoding Block B 190 and Block C 200 to form Block D 210, which may then be forwarded to Node 4 150. For example, Node 3 140 may create Block D 210 by performing an exclusive-OR operation of the information corresponding to Block B 190 and Block C 200 at Node 3 140. As a result, Block D 210 may contain binary digit 1, which is the exclusive-OR of binary digit 0 (corresponding to Block B 190) and binary digit 1 (corresponding to Block C 200).

Node 4 150 may then forward Block D 210 to Node 5 160 and Node 6 170. Further, since the information corresponding to both Block B 190 and Block C 200 may be recovered by performing a decoding function on Block D 210, Block D 210 is simultaneously useful to both Node 5 160 and Node 6 170 in order to reconstruct Content A 180.

That is, Node 5 160 may already have received Block B 190 from Node 1 120. Then, having received Block D 210 from Node 4 150 and having knowledge of the encoding scheme used to create Block D 210, Node 5 160 may perform a decoding function on Block D 210 to calculate the information corresponding to Block C 200 without actually receiving Block C 200. Thus, Node 5 160 may utilize the information corresponding to Block B 190 and Block C 200 to reconstruct Content A 180 according to at least one implementation of content distribution using network coding.

Similarly, Node 6 170 may have already received Block C 200 from Node 2 130. Then, having received Block D 210 from Node 4 150 and having knowledge of the encoding scheme used to create Block D 210, Node 6 170 may perform a decoding function on Block D 210 to calculate the information corresponding to Block B 190 without actually receiving Block C 200. Thus, Node 6 170 may utilize the information corresponding to Block B 190 and Block C 200 to reconstruct Content A 180.

One or more implementations of content distribution using network coding may further provide an end-system content distribution solution that efficiently utilizes network resources to provide client nodes with blocks of information from multiple network paths. Such efficient utilization of resources may include providing one or more nodes on Network 100 with advance knowledge of the arrangement and locations of other nodes on Network 100 as well as advance knowledge regarding which of such nodes on Network 100 are to distribute original blocks and which nodes are to distribute encoded blocks. Thus, content distribution using network coding may be relevant even as networks increase in size and nodes on the network toggle between being online and offline.

For example, when a source node sends a block to a receiving node, the source node may generate and send a linear combination of the data available at the source node. The linear combination may include an exclusive-OR operation. Thus, when a receiving node receives sufficient linearly independent combinations of blocks, the receiving node may then reconstruct the original digital content by solving a system of linear equations to decode the received linear combinations.

Further, to reduce wasted transfers, nodes on Network 100 may endeavor to send only blocks having innovative information to other nodes on Network 100, although absolute compliance to this desire is not required for effective implementation of content distribution according to the examples described herein. Such efficient transfers may be accomplished by the nodes on Network 100 periodically exchanging information regarding the blocks stored locally at the respective nodes on Network 100. The periodic exchange of information may occur when a respective one of the nodes on Network 100 has determined that locally stored information may be useful for another node to reconstruct at least a portion of the original digital content.

The aforementioned periodic exchange of information may be implemented by storing the information at one or more central servers on Network 100. Various nodes may then access one of the central servers to determine which of the other nodes on Network 100 store blocks that contain innovative information. Alternatively, decentralized mechanisms may be used to communicate directly with other nodes on Network 100 to exchange information regarding the blocks stored at the respective nodes. As a further alternative, any combination in whole or in part of the approaches discussed above may be implemented.

Thus, when a particular node on Network 100 has knowledge of the information contained in the blocks stored at other nodes on Network 100, the particular node may request that the other nodes transfer only the information that the particular node currently lacks (i.e., innovative information). Alternatively, a particular node on Network 100 may randomly generate new blocks and push the new blocks to other nodes on Network 100, regardless of whether or not the other nodes have determined the particular node has innovative information stored locally. In response, the respective receiving nodes may discard any packet that may be determined to not contain innovative information for the respective receiving node.

Figure 2:
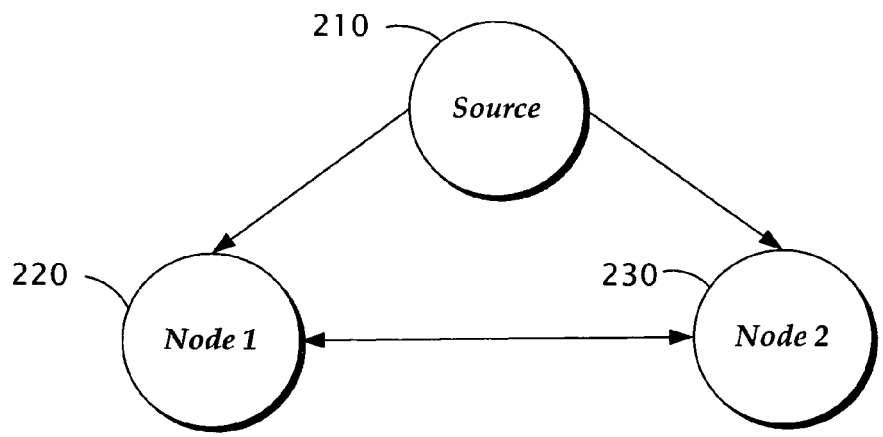
FIG. 2 shows a content distribution network environment in which examples of content distribution using network coding may also be implemented.

FIG. 2 shows example Computer Network 200 in which one or more examples of content distribution using network coding may be implemented. Computer Network 200 may include multiple interconnected nodes in a manner similar to that of FIG. 1.

A further example implementation of content distribution using network coding may be explained by considering an example scenario in which Source 210 is to distribute, over Network 200, an original content file containing six bytes (i.e., Bytes 1-6). Further, the example scenario may assume the sample values: Byte 1=70, Byte 2=91, Byte 3=5, Byte 4=35, Byte 5=22, and Byte 6=15.

By this example, Source 210 may create multiple blocks from the original content file, with each block includes two sequential bytes from the original content file. For example, Source 210 may create: Block 1 comprising Byte 1 and Byte 2; Block 2 comprising Byte 3 and Byte 4; and Block 3 comprising Byte 5 and Byte 6.

Source 210 may then create linear combinations of Block 1, Block 2, and Block 3 using a set of coefficient vectors to encode Block 1, Block 2, and Block 3 into a single encoded block. The coefficient vectors may be chosen randomly, chosen according to a set schedule, chosen from a central repository of such information on the network, or chosen by any method that produces a set of coefficient vectors useable by Source 210 in order to linearly encode Block 1, Block 2, and Block 3.

For the purposes of describing the present example, Source 210 may choose coefficient vectors randomly from a set of numbers between 1 and 256. The set of numbers from which coefficient vectors may be chosen may be any set of numbers, for example, a set of numbers which will produce the greatest number of linearly independent coefficient vectors in the content distribution system. In preparing the encoded block, for example, Source 210 may choose a first coefficient vector to be 6, 90, and 52. In order to create the encoded block, Source 210 may treat the individual bytes in the block as a vector. However, Source 210 may linearly encode the information in each Block 1, Block 2, and Block 3 in any manner that is consistent with producing a new block containing information that is a linear combination of information stored within the original block. In this example, the first encoded block called $e_1$ is created by multiplying the coefficient vectors by each value in the vector.

For example, using the first coefficient vector [6, 90, and 52] and byte values Byte 1=70, Byte 2=91, Byte 3=5, Byte 4=35, Byte 5=22, and Byte 6=15, Source 210 may creates $$e_1 = 6\binom{70}{91} + 90\binom{5}{35} + 52\binom{22}{15}.$$

Performing the multiplication results in $$e_1 = \binom{420}{546} + \binom{450}{3150} + \binom{1144}{780}.$$

Performing the addition results in $$e_1 = \binom{2014}{4476}.$$

Source 210 may then forward newly encoded block $e_1$ and the coefficient vector [6, 90, 52], to Node 1 220.

Source 210 may then create a new encoded block $e_2$ by repeating the operation used to create $e_1$ using a new coefficient vector. For example, using another coefficient vector [18, 2, 128] and byte values Byte 1=70, Byte 2=91, Byte 3=5, Byte 4=35, Byte 5=22, and Byte 6=15, Source 210 may produce encoded block $e_2$ using the same method as above. In this example, $$e_2 = \binom{4086}{3628}.$$

Source 210 may forward the newly encoded block $e_2$, and the coefficient vector [18, 2, 128], to Node 2 230.

Node 1 220 may then learn of the linear independence of the linearly encoded blocks in possession of other nodes on network 200 to further determine whether or not the blocks contain innovative information that Node 1 220 may use to decode the encoded blocks and recover the original content file. Thus, Node 1 220 may then send a query to Node 2 230 to request that Node 2 230 send information that Node 1 220 may use to determine the linear independence of the information encoded in the blocks that Node 2 230 currently possesses.

Node 2 230 may use any method to produce the information that may enable Node 1 220 to determine the linear independence of the information in the encoded blocks. For example, Node 2 230 may create a linear combination of the individual coefficient vectors currently at Node 2 230 to produce a master coefficient vector. In this example, encoded block $e_2$ having coefficient vector [18, 2, 128] is currently at Node 2 230, and therefore Node 2 230 may not need to perform the aforementioned linear combination. Therefore, Node 2 230 may forward coefficient vector [18, 2, 128] to Node 1 220.

Node 1 220 may receive coefficient vector [18, 2, 128] from Node 2 230, and seek to determine the linear independence of the received coefficient vector with respect to the coefficient vectors of the blocks Node 1 220 currently possesses. Any mathematical operation that results in Node 1 220 determining the linear independence of the coefficient vectors received from Node 2 230 may be used.

For example, Node 1 220 may place coefficient vector [18, 2, 128] received from Node 2 230 into a matrix and produce a row-reduced form of the matrix. Node 1 220 may then analyze the number of non-zero rows in the row-reduced form of the matrix to discover a rank of the matrix. The rank of the respective matrices indicates the number of linearly independent rows of the respective matrices. In the current example, by adding the received coefficient vector to the matrix and calculating the rank of the matrix, Node 1 220 is determining the number of solutions to the system of linear equations Node 1 220 currently possesses.

For example, Node 1 220 may calculate the rank of the matrix formed using the set of coefficient vectors of encoded blocks that Node 1 220 already possesses. Node 1 220 may calculate rank 1 by performing row reduction on the matrix. Row reduction for calculating the rank of a matrix is a known mathematical operation. Thus, calculating the rank of the matrix at Node 1 200 is not limited to any particular method.

Accordingly, the row-reduced version of the matrix (6 90 52) is (1 15 8.$\overline{6}$), and the number of non-zero rows in the row reduced matrix is 1, and accordingly, the rank of the matrix is 1.

Further, Node 1 220 may now form a new matrix using the coefficient vectors of the blocks that Node 1 220 already possesses and the coefficient vector received from Node 2 230, which in this example would be $$\begin{pmatrix} 6 & 90 & 52 \\ 18 & 2 & 128 \end{pmatrix}.$$

Once Node 1 220 has formed the new matrix, Node 1 220 may calculate the rank of the new matrix.

Accordingly, the row reduced version of the matrix is $$\begin{pmatrix} 1 & 0 & 7.0995 \\ 0 & 1 & 0.10448 \end{pmatrix},$$

and further, the number of non-zero rows in the matrix is 2, therefore the rank of the matrix is 2. Node 1 220, may, for example, compare the rank of the second matrix (i.e., 2) and the rank of the first matrix (i.e., 1), and determine that the rank of the second matrix is greater, therefore the information Node 2 230 possesses is linearly independent. Node 1 220 may send a request to Node 2 220 to transmit the block or blocks created using the coefficient vector that was sent and which Node 1 220 used to perform the calculations above.

In this example, while Node 1 220 performs the above calculation, Node 2 220 may have further received an additional encoded block from Source 210. For example, Source 210 may choose another coefficient vector, [213, 91, 159] to encode a new block $e_3$ that would equal $$\begin{pmatrix} 18863 \\ 24953 \end{pmatrix}$$

and then transmit block $e_3$ and the coefficient vector used to create $e_3$ to Node 2 230.

Node 1 220 may send Node 2 230 a new request to determine if Node 2 230 possesses any information which is linearly independent with respect to the information Node 1 220 currently possesses. Node 2 230 may again prepare a master coefficient vector which may be created from a linear combination of the coefficient vectors of all the encoded blocks that Node 2 230 possesses (i.e., $e_2$ and $e_3$) with coefficient vectors [18, 2, 128] and [213, 91, 159] respectively. Node 2 230 may prepare the master coefficient vector by producing the linear combination of the above coefficient vectors to produce a new coefficient vector [231, 93, 287], which Node 2 230 then transmits to Node 1 220.

Node 1 220 may receive new coefficient vector, [231, 93, 287] and determine whether the new coefficient vector is linearly independent with respect to the coefficient vectors Node 1 220 currently possesses. Node 1 220 has stored the results of the last calculation of the rank (i.e., 2) of the matrix formed using the coefficient vectors of block $e_2$ and block $e_3$. Node 1 220 may, for example, produce a new matrix using the coefficient vectors of block $e_2$ and block $e_3$ in combination with the new coefficient vector received from Node 2 230, resulting in a matrix of the form $$\begin{pmatrix} 6 & 90 & 52 \\ 18 & 2 & 128 \\ 231 & 91 & 159 \end{pmatrix}.$$

Accordingly, the row reduced form of the matrix is $$\begin{pmatrix} 1 & 0 & 0 \\ 0 & 1 & 0 \\ 0 & 0 & 1 \end{pmatrix},$$

and since the number of non-zero rows in the matrix is 3, the rank of the matrix is 3. Node 1 220 may compare the rank (i.e., 3) of the new matrix with the rank of the previous matrix (i.e., 2), and determine the rank of the new matrix is greater than the rank of the previous matrix. Thus, Node 1 220 may determine that Node 2 230 possesses information that is linearly independent from the information that Node 1 220 possesses. Node 1 220 may then send a request to Node 2 230 to re-encode the encoded blocks that Node 2 230 produced using the coefficient vector that was transmitted to Node 1 220.

Node 2 230 may use any method to produce a newly encoded block that is consistent with sending linearly independent information with regard to the original encoded blocks received from Source 210. For example, Node 2 230 may create a sum of $e_2$ and $e_3$ to produce a new encoded block $e_4$, and $e_4$ may equal to $$\begin{pmatrix} 22949 \\ 28581 \end{pmatrix}.$$

Node 2 230 may now transmit block $e_4$ to Node 1 220 and not need to further send the coefficient vector used to produce block $e_4$ because the coefficient vector was sent to Node 1 220 to perform the calculation.

For example, Node 1 220 may have received block $e_4$ from Node 2 230, and Node 1 220 may determine that enough encoded blocks have been received to begin decoding the encoded blocks. Node 1 220 may then solve the system of linear equations represented by the encoded blocks that Node 1 220 possesses in order to determine the values of the vectors in the original unencoded blocks possessed by Source 210. Node 1 220 may use any method suitable to solve the system of linear equations to determine the values of the vectors stored in the original unencoded blocks and is not limited in the way in which Node 1 220 may perform the calculation.

For example, $e_1$ equals $$\begin{pmatrix} 2014 \\ 4476 \end{pmatrix}$$

with coefficient vector [6, 90, 52]. $e_2$ equals $$\begin{pmatrix} 4086 \\ 3628 \end{pmatrix}$$

with coefficient vector [18, 2, 128]. $e_4$ equals $$\begin{pmatrix} 22949 \\ 28581 \end{pmatrix}$$

with coefficient vector [231, 93, 287]. In order to solve the system of linear equations to learn the values of the vectors in the original blocks, Node 1 220 may assign variables to represent each of the unencoded blocks. For example, Node 1 220 may assign the variable x to represent the first unencoded block, may assign the variable y to represent the second unencoded block, and may assign the variable z to represent the third unencoded block. Therefore, Node 1 220 may determine the first equation in the system of linear equations to be $$6x + 90y + 52z = \begin{pmatrix} 2014 \\ 4476 \end{pmatrix}$$

which represents encoded block $e_1$, the second equation to be $$18x + 2y + 128z = \begin{pmatrix} 4086 \\ 3628 \end{pmatrix}$$

which represents encoded block $e_2$, and the third equation to be $$231x + 93y + 287z = \begin{pmatrix} 22949 \\ 28581 \end{pmatrix}$$

which represents encoded block $e_4$.

Node 1 220 may then solve the system of linear equations using any method, and in solving the equations determines that x (i.e., unencoded block 1) equals $$\begin{pmatrix} 70 \\ 91 \end{pmatrix},$$

and determines y (i.e., unencoded block 2) equals $$\begin{pmatrix} 5 \\ 35 \end{pmatrix},$$

and further determines z (i.e., unencoded block 3) equals $$\begin{pmatrix} 22 \\ 15 \end{pmatrix}.$$

Node 1 220 may interpret these vectors and recreate the byte structure of the original file. Node 1 220 may use any method to interpret these vectors in accordance with the aspects of the current embodiment to recreate the original file.

Although the example used in conjunction with FIG. 2 utilized certain simplifications, obviously different choices may be made for alternative implementations. For instance, alternative examples for exchanging information regarding the coefficients used to encode packets may contemplate transmitting re-encoded blocks without determining in advance whether the re-encoded blocks contain new information or not exchanging information at all. Similarly, although all received information was used to create new encoded blocks, a subset thereof may be used. Other tradeoffs or choices could also be made, such as the particular encoding scheme depending on the particular application.

Further, although the example used in conjunction with FIG. 2 was implemented with a real number system for illustrative purposes, the example may have been implemented using any mathematical number system, for example, a finite or Galois field.

Figure 3:
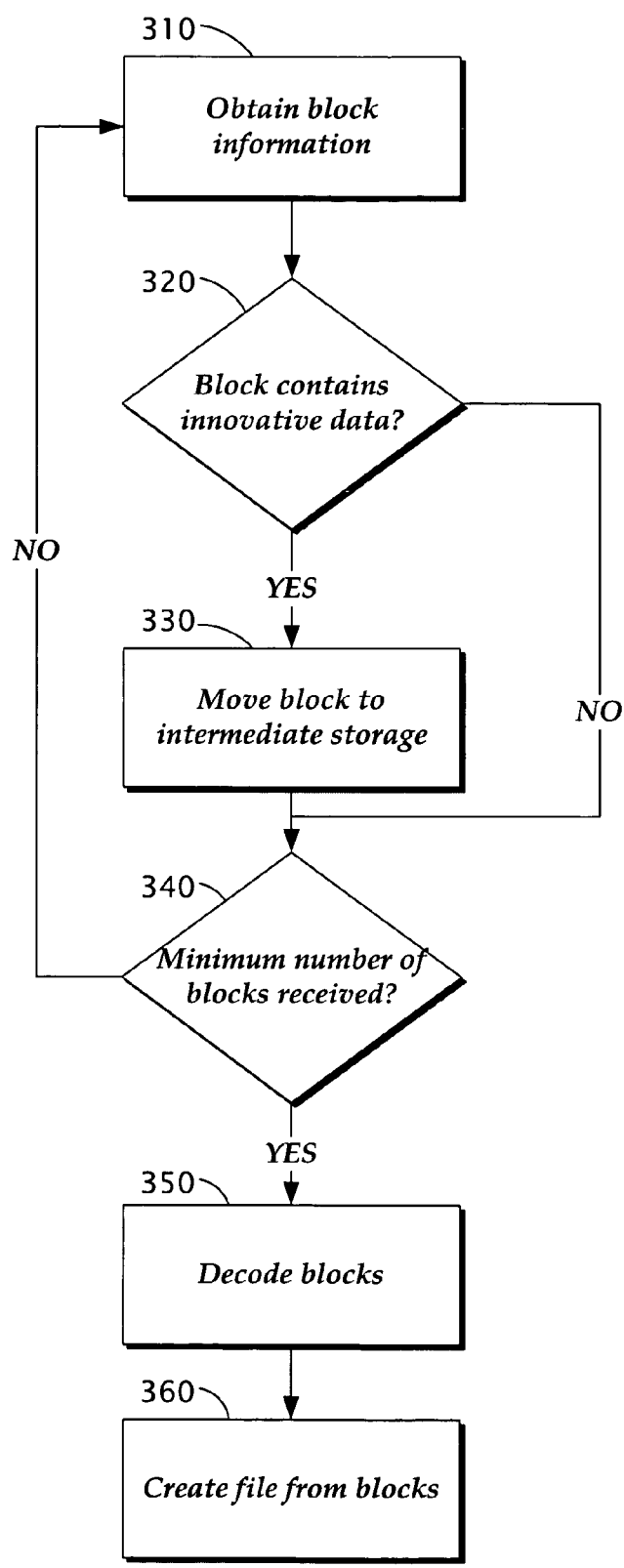
FIG. 3 shows an example processing flow for content distribution using network coding from the perspective of a receiver.

FIG. 3 shows processing flow 300 to illustrate how a node might act as a receiver in a content distribution network.

Operation 310 may represent a node obtaining information about a specific block which exists on the network. Referring back to the example illustrated with respect to FIG. 2, block information may take the form of a set of coefficients used to re-encode the block. However, block information may also take any form or structure that gives an indication as to the contents of the block, and block information may be obtained in any manner consistent with the capabilities of the network, the nodes on the network, or the like. For example, block information may be obtained directly from another node on the network, the block information may be obtained from a central repository of such information on the network, or the node may have already received the block and may have inspected the block to determine the information.

Decision 320 may represent a determination by the node as to whether or not the block information indicates that the block contains innovative information that may be helpful in reconstructing at least a portion of the original content. Information that is innovative to the node is, for example, a whole block or a portion of a block that the node does not currently possess. This determination may take any form, for example, by performing a calculation using the block information. Alternatively, any operation using the block information which returns an indication as to whether or not the information in the block is innovative may be used. For instance, in the example associated with FIG. 2, the determination may be performed by calculating the rank of a matrix.

Operation 330, subsequent to positive decision 320, may refer to the block being transferred to intermediate block storage, which may comprise physical memory, a hard drive, non-volatile flash memory, or the like. Once Operation 330 has been completed, procedure flow continues to Decision Block 340.

Decision 340, subsequent to negative decision 320 and operation 330, may represent a determination of whether a minimum number of blocks necessary to reassemble the original file content have been received. The minimum number of blocks necessary to reassemble the original file content may be N, which is the number of blocks into which the original file content is divided. In response to a negative determination, processing flow 300 may return to Operation 310 so further blocks may be processed. In response to positive decision 340, processing flow 300 may proceed to Operation 350.

Operation 350 may refer to an operation wherein a number of encoded blocks that are stored in intermediate block storage are decoded to produce the set or subset of original blocks that comprise the file. Decoding of the blocks may take a form in which the result of the decoding operation is the original set of blocks that may have been created by the source of the file in the Content Distribution Network. Processing flow 300 may then proceed to Operation 360.

Operation 360 may represent the set of original blocks produced by the decoding operation in Operation 350 being combined to assemble the original content file. A method by which the original blocks may be reconstructed to form the original content may be used.

The order and timing of the operations associated with FIG. 3 are provided as an example only. In alternative implementations, either or both of the order and timing of the operations may be varied. For example, Operation 350 may take place after Operation 310 if enough encoded blocks have been received to begin decoding at least one encoded block.

Figure 4:
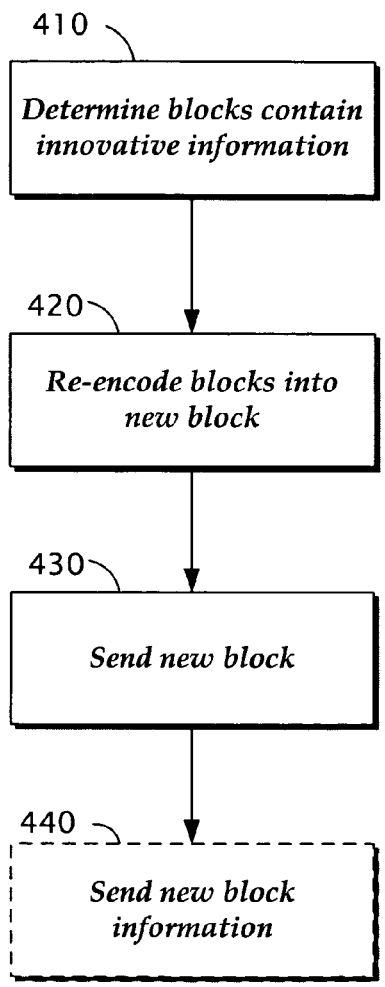
FIG. 4 shows an example processing flow for content distribution using network coding from the perspective of a sender.

FIG. 4 shows example flow 400 to illustrate how a node may act as a sender in a Content Distribution Network.

Operation 410 may refer to a determination that the sender possesses a number of blocks that contain innovative information that may be useful for decoding another block or set of blocks on another node in the Content Distribution Network. The determination may occur locally on the sender, on another node on the network, on a central node responsible for such operations, or at any other suitable location. The determination of whether the block contains innovative information may result in a linear combination of the innovative information with other information at the sending node being distributed on the Content Distribution Network.

Operation 420 may refer to the sender re-encoding one or more local blocks to produce a newly encoded block. The re-encoding may comprise an operation that is in accordance with combining any number of blocks stored locally on the sender to produce a new block which may be used by another node on the Content Distribution Network.

Operation 430 may refer to the sender transmitting the newly encoded block created at Operation 420. The newly encoded block may be transmitted in accordance with the aspects of the current embodiments and is not limited in the manner in which it may be transmitted.

Operation 440, which may be optional, may refer to the sender choosing to further transmit the information used to re-encode the block in a separate step, if the information used to re-encode the block was not encoded into the new encoded block. The block encoding information may be transmitted in accordance with the aspects of the current embodiments and is not limited in the manner in which it may be transmitted.

The order and timing of the operations associated with FIG. 4 are provided as an example only. In alternative implementations, either or both of the order and timing of the operations may be varied. For example, Block 420 may be undertaken to re-encode new blocks that are useful for a receiving node as well as all the nodes connected to the receiving node. In this manner, the receiving node may create blocks that are useful to nodes other than the node with which it is in direct communication.

Figure 5:
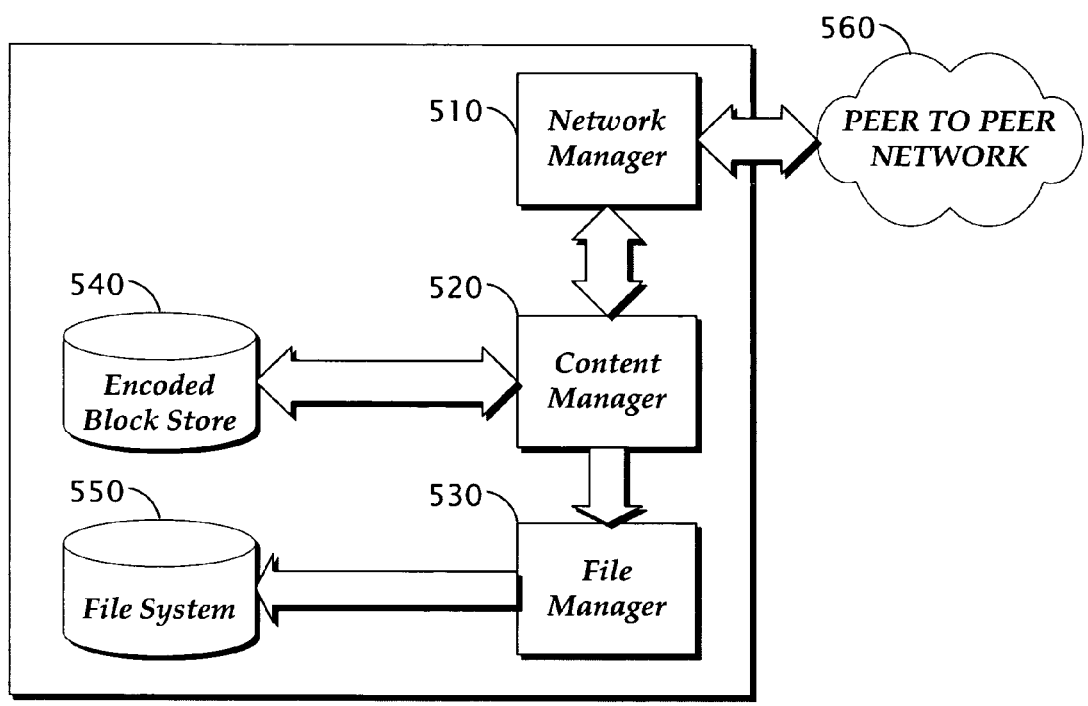
FIG. 5 shows an example system in which content distribution using network coding may be implemented.

FIG. 5 shows example node 500 in a Content Distribution Network.

Network Manager 510 may enable node 500 to communicate with other nodes, servers, devices, or the like in the Content Distribution Network. Network Manager 510 may send and receive packets or blocks of information, send or receive requests to perform an operation of any type, or send and receive other information used by node 500 to participate in the Content Distribution Network.

In communicating with other nodes on the Content Distribution Network, Network Manager 510 may correct errors during transmission, suspend and resume the sending of information to other nodes, servers, devices and the like on the Content Distribution Network, and may further verify that node 500 is permitted to participate in the Content Distribution Network. Further still, Network Manager 510 may verify the legitimacy or authenticity of the encoded blocks.

Network Manager 510 may further communicate with Content Manager 520 via, e.g., an application programming interface (API), a remote procedure call over a network. Network Manager 510 may transmit blocks, information with respect to blocks stored elsewhere on the network, or information that Content Manager 520 may require for node 500 to participate in the Content Distribution Network in accordance with the aspects of the current embodiments.

Content Manager 520 may receive the number and size of blocks that the original file content was divided into by an origination source from Network Manager 510. Content Manager 520 may further receive blocks from Network Manager 510 send blocks using Network Manager 510, commit received blocks to Encoded Block Store 540, abort the storage of blocks that have not been received in their entirety or that have been determined to contain an error or corruption, and transfer blocks that are stored within Encoded Block Store 540 to both Network Manager 510 and File Manager 530.

Content Manager 520 may also perform at least one calculation to determine if a node in the Content Distribution Network contains innovative information that is useful to the node in decoding the original blocks into which original file content was divided by an origination node on the Content Distribution Network. If Content Manager 520 determines that a node in the Content Distribution Network contains innovative information, Content Manager 520 may communicate with Network Manager 510 and issue a request to receive the block, issue a request for the node containing the innovative information to re-encode the information and send the information, or issue another request for Content Manager 520 to function in accordance with the participation of the node in the Content Distribution Network.

Further, Content Manager 520 may also perform at least one calculation on behalf of another node on the Content Distribution Network to determine if the node contains information innovative to another node on the Content Distribution Network.

Content Manager 520 may further re-encode blocks stored within Encoded Block Store 540 using a method for the node to produce encoded blocks that are useful to other nodes in the Content Distribution Network or for the node to participate in the Content Distribution network in accordance with the aspects of the current embodiments.

Deletion of blocks in Encoded Block Store 540, memory management in Encoded Block Store 540, or any operation that results in optimal operation of Encoded Block Store 540 may also be performed by Content Manager 540.

Content Manager 520 may also determine when the number of encoded blocks necessary to decode the blocks and recover the original file has been received and are stored in Encoded Block Storage 540. Upon making this determination, Content Manager 520 may decode the encoded blocks and transfer each decoded block to File Manager 530.

File Manager 530 and Content Manager 520 may communicate using, e.g., an application programming interface (API) or a remote procedure call over a network. File Manager 530 may receive a number of unencoded blocks from Content Manager 520 and combine a number of unencoded blocks to create a copy of the original file content sent by an origination node in the Content Distribution Network.

Once File Manager 530 has combined the unencoded blocks to create the copy of the original file content, File Manager 530 may communicate with File System 550 to commit the copy of the original file to the storage capabilities of File System 550. File System 550 may represent a hard drive, a network share, non-volatile removable storage, or any physical storage medium capable of storing the copy of the original file in accordance with the aspects of the current embodiments. File Manager 530 may further communicate with an operating system, a component, an application programming interface (API), or any other device that stores the copy of the original file on behalf of the File Manager 530.

Figure 6:
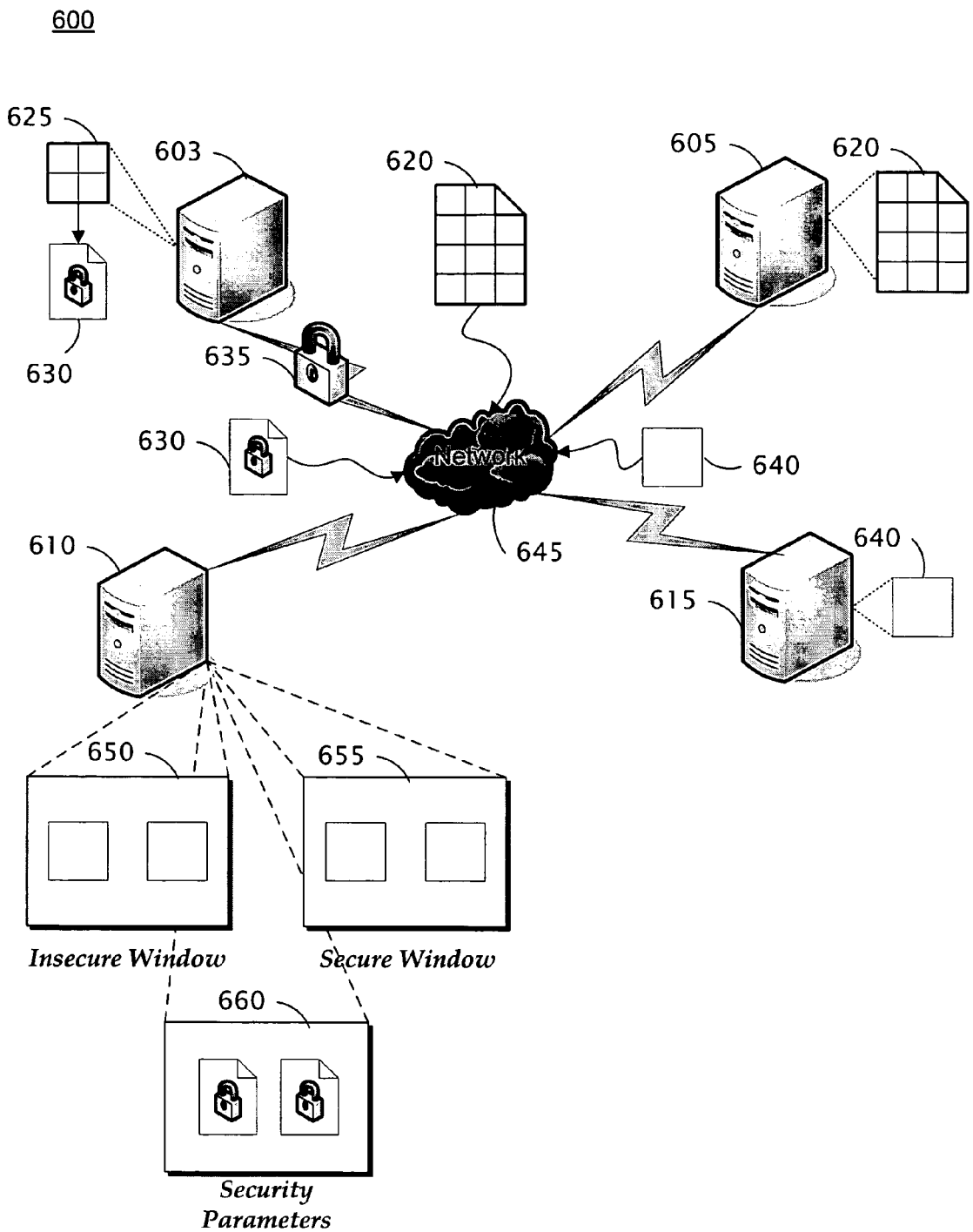
FIG. 6 shows an example content distribution system in which security for network coding file distribution may be implemented.

FIG. 6 shows an example security for network coding file distribution system 600.

Source Node 605 stores File 620 which is to be distributed to Node 1 610 and Node 2 615 via Network 645. Security Server 603 is also connected to Network 645, but may be connected via a secure connection to ensure the information communicated to other nodes in the network are not tampered with by a third party in the example security for network coding file distribution system. Such information may be any digital information useful to any participant in the example security for network coding file distribution system system 600.

Source node 605 may choose to divide File 620 into a number of unencoded blocks and transmit those unencoded blocks to Security Server 603. For example, Source Node 605 may divide File 620 into n blocks, e.g. $(b_1, b_2, \ldots b_n)$.

Once the blocks of File 620 (e.g. $(b_1, b_2, \ldots b_n)$) are received at Security Server 603, Security Server 603 may further subdivide a Block 625 (e.g. $b_i$) of File 620 into any number of sub-blocks, for example m sub-blocks. Security Server 603 may, for example, consider File 620 to be an m×n mathematical matrix of elements of $Z_q$. For example, Security Server 603 may represent File 620 in the following manner:

$$F = (b_1, b_2, \ldots b_n) = \begin{pmatrix} b_{1,1} & b_{1,2} & \cdots & b_{1,n} \\ b_{2,1} & b_{2,2} & \cdots & b_{2,n} \\ \vdots & & \ddots & \vdots \\ b_{m,1} & b_{m,2} & \cdots & b_{m,n} \end{pmatrix}$$

Security Server 603 may now choose Hash Parameters, which may be part of Security Parameters 630, e.g. G, where G=(p, q, g), p and q may be two large prime numbers chosen at random to satisfy the mathematical property q|(p−1) of order $\lambda_p$, where $\lambda_p$ may be a discrete log security parameter, and $\lambda_q$, where $\lambda_q$ may be a discrete log security parameter, and g is an m vector of element of $Z_p$ generators of order q.

Security Server 603 may then define a hash, e.g. $h(b_i)$ of each of the m sub-blocks for each of the n blocks of File 620 by using, e.g., an m vector $g=(g_1, g_2 \ldots g_m)$ of the mathematical matrix m×n, such that the hash may be defined as:

$$h(b_i) = \prod_{k=1}^{m} g_k^{b_{k,i}} \bmod p$$

Security Server 603 may now calculate the hash, also known as a random mask, of File 620 by creating a vector of the results of the calculation of each hash $h(b_i)$ of the m sub-blocks. For example, Security Server 603 may calculate the hash, also known as a random mask, of File 620, represented in the function below by the mathematical symbol F in the following manner:

$$H(F) = h(b_1), h(b_2), \ldots h(b_n))$$

Security Server 603 may perform this operation for each cooperative node coupled to the Network 645, choosing a set of hash parameters G, which may be part of Security Parameter 630, uniquely for each cooperative node coupled to the network, and calculating a new hash, also known as a random mask, of File 620 using the new set of hash parameters. Typically, cooperative nodes coupled to Network 645 may ensure security and not share Security Parameters 630 with other cooperative nodes coupled to Network 645.

Node 1 610 may then join the security for network coding file distribution system 600, contact Security Server 603 via the Network 645 and Secure Network Path 635, and request Security Parameter 630, which Node 1 610 places in Security Parameter Storage 660, and also request a unique hash of File 620, also known as a random mask, of File 620 which Node 1 610 places in local storage. Node 2 615 may also have already joined the security for network coding file distribution system 600 and may be exchanging unencoded and encoded blocks of File 620.

Node 1 610 may send a query to Node 2 615 and discover that Node 2 615 possesses innovative information, and Node 1 610 may further request that Node 2 615 re-encode the blocks that Node 2 615 has stored locally to produce a New Encoded Block 640. Node 2 615 may produce New Encoded Block 640, e.g. e, by re-encoding the blocks, e.g. $b_i$, choosing a set of arbitrary coefficient vectors $$\vec{c},$$

and performing the calculation in the following manner:

$$e = \sum_{i=1}^{n} c_i b_i$$

Node 2 615 may then transmit New Encoded Block 640, e.g. e, as well as the coefficient vectors $$\vec{c}$$

used to encode New Encode Block 640 via Network 645 to Node 1 610.

When New Encoded Block 640 is received at Node 1 610, Node 1 610 may store the New Encoded Block 640 and its corresponding coefficient vectors $$\vec{c}$$

in Insecure Window 650.

Node 1 610 may then verify the authenticity of New Encoded Block 640, Node 1 610 may apply the hash of File 620, also known as a random mask, received from Security Server 603 to the New Encoded Block 640 and compare it to a linear combination of the mask-based hashes weighted by the coefficient vector of the new encoded block. For example, New Encoded Block 640 may be considered an m column vector of element of $Z_q$, $e=(e_1, \ldots e_m)$. Node 1 610 may then perform a comparison in the following manner to verify the authenticity of New Encoded Block 640:

$$\prod_{k=1}^{m} g_k^{e_k} = \prod_{i=1}^{n} h^{c_i}(b_i)$$

If Node 1 610 determines the hash and the expected hash are equal, Node 1 has validated or otherwise verified New Encoded Block 640 and may move New Encoded Block 640 to Secure Window 655.

If Node 1 610 determines the hash and the expected hash are not equal, Node 1 610 may send an alert to Node 2 615 to notify Node 2 615 that Node 2 615 has transmitted an invalid New Encoded Block 640 via Network 645. Node 2 615 may then undertake an operation to determine which locally stored blocks, whether unencoded or encoded, are invalid.

Further, for example, if Node 2 615 is a malicious node and undertakes a denial of service attack against Node 1 610, Node 2 615 may repeatedly transmit alerts to Node 1 610. Node 1 610 may respond to each alert by undertaking an operation to determine which one or more unencoded or encoded blocks it has stored in Insecure Window 650 are invalid, which may be a time-consuming operation and therefore delays Node 1 610 from participating in the sharing of information with other nodes. However, Node 1 610 may verify the authenticity of the alert received from Node 2 615 before undertaking an operation to determine which one or more unencoded or encoded blocks it has stored in Insecure Window 650 are invalid.

Node 1 610 may accomplish verification of the alert by receiving a second set of security parameters, (e.g. random masks and mask-based hashes) from Security Server 603. Security Server 603 may choose the second set of security parameters in a less mathematically complex fashion such that calculations performed using the second set of security parameters may be less computationally intensive. Node 1 610 may then create a new encoded block by creating a linear combination of the one or more encoded blocks in Insecure Window 650. Next, Node 1 610 may apply the random mask received from Security Server 603 to the new encoded block and compare it to a linear combination of the mask-based hashes weighted by the coefficient vector of the new encoded block. If Node 1 610 determines these two elements are equal, Node 1 610 has determined the alert is valid and may act accordingly. If Node 1 610 determines these two elements are unequal, Node 1 610 has determined that the alert is invalid and may choose to ignore the alert and further may choose to no longer communicate with Node 2 615.

Figure 7:
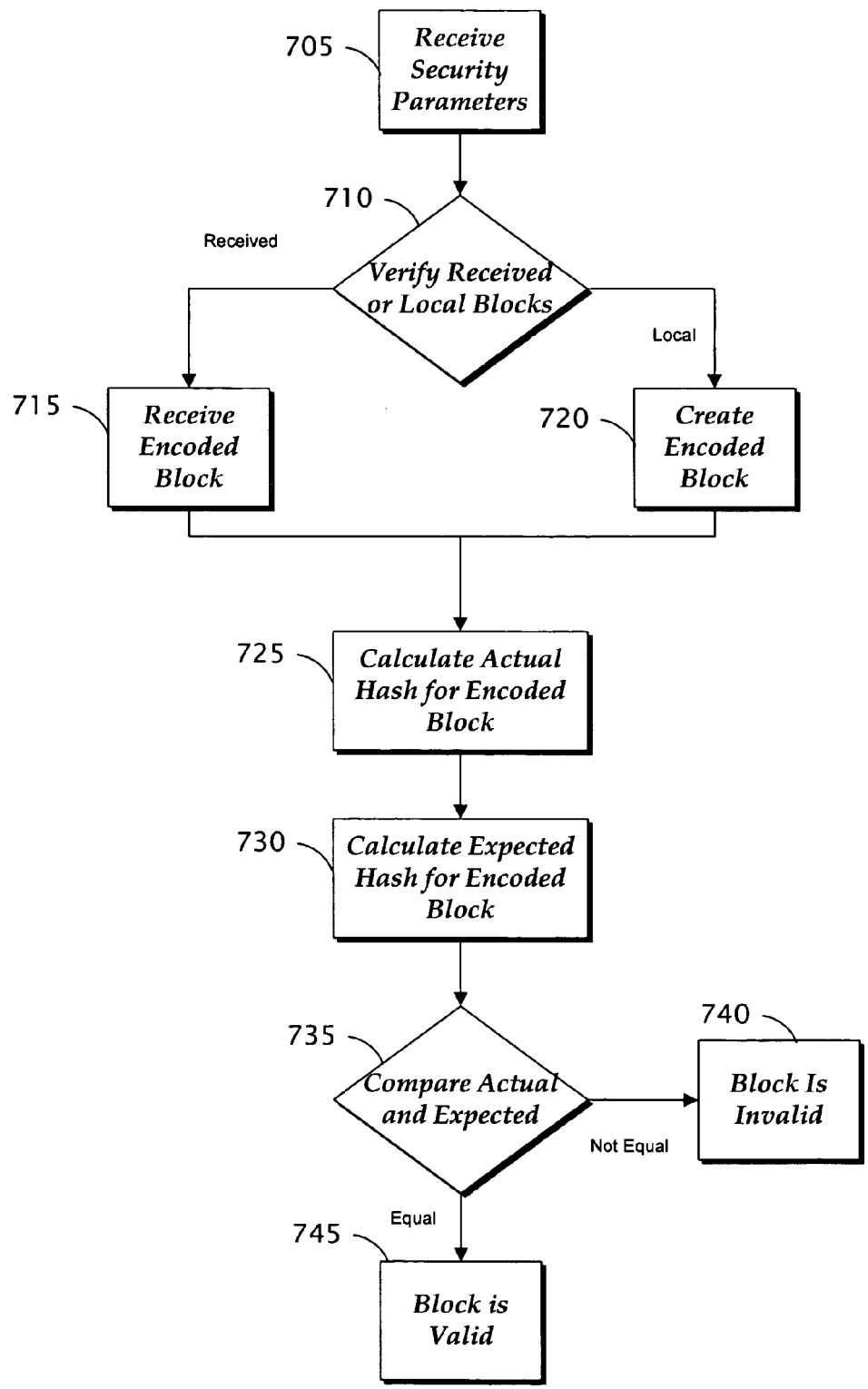
FIG. 7 shows an example processing flow in which an encoded block corresponding to a file may be verified as authentic in a content distribution network environment.

FIG. 7 shows example flow 700 which may illustrate how a node in an example security for network coding file distribution system may determine the validity of a received block or set of received blocks.

Operation 705 may refer to a cooperative node in an example security for network coding file distribution system receiving a set of security parameters. These security parameters are generated by a secure source in the example security for network coding file distribution system.

Decision 710 may refer to an operation to determine whether the node is to verify a single newly received encoded block or a set of encoded blocks the node has stored locally.

A determination of Received leads to Operation 715 in which the node receives a block and the set of coefficients used to encode the block.

A determination of Local lead to Operation 720 in which the node creates a new encoded block by making a linear combination of all the encoded blocks and the coefficients used to the encode the encoded blocks the node has stored locally. At this point, the node may generate a new set of random coefficients and multiply the coefficients of each of the encoded blocks the node has stored locally by the new set of random coefficients. This may be done to defeat a pairwise Byzantine attack in which a malicious node has sent the node a pair of invalid encoded blocks and offset the first invalid encoded block by a positive value and offset the second invalid encoded block by a negative identical value such that a linear combination of the two invalid blocks produces a new encoded block that does not have an offset.

Both Operation 715 and Operation 720 lead to Operation 725 in which the node applies the hashing function to either the received encoded block from Operation 715 or the new encoded block from Operation 720 to determine the actual hash value of either the received encoded block from Operation 715 or the new encoded block from Operation 720.

Operation 725 may then lead to Operation 730 in which the node calculates the expected hash of either the received encoded block from Operation 715 or the new encoded block from Operation 720. The node calculates the expected hash by utilizing the security parameters received at Operation 705 and the coefficients of either the received encoded block from Operation 715 or the new encoded block from Operation 720.

Decision 735 may refer to an operation in which the node compares the actual hash calculated at Operation 725 and the expected hash calculated at Operation 720. A determination that the actual hash and the expected hash are equal leads to Operation 745 in which either the received encoded block from Operation 715 is determined to be valid or all the locally stored encoded blocks used to generate the new encoded block from Operation 720 are valid.

A determination that the actual hash and the expected has are not equal leads to Operation 740. Operation 740 may indicate that the received encoded block from Operation 715 is invalid, or, at least one of the locally stored encoded blocks used to generate the new encoded block from Operation 720 is invalid.

Figure 8:
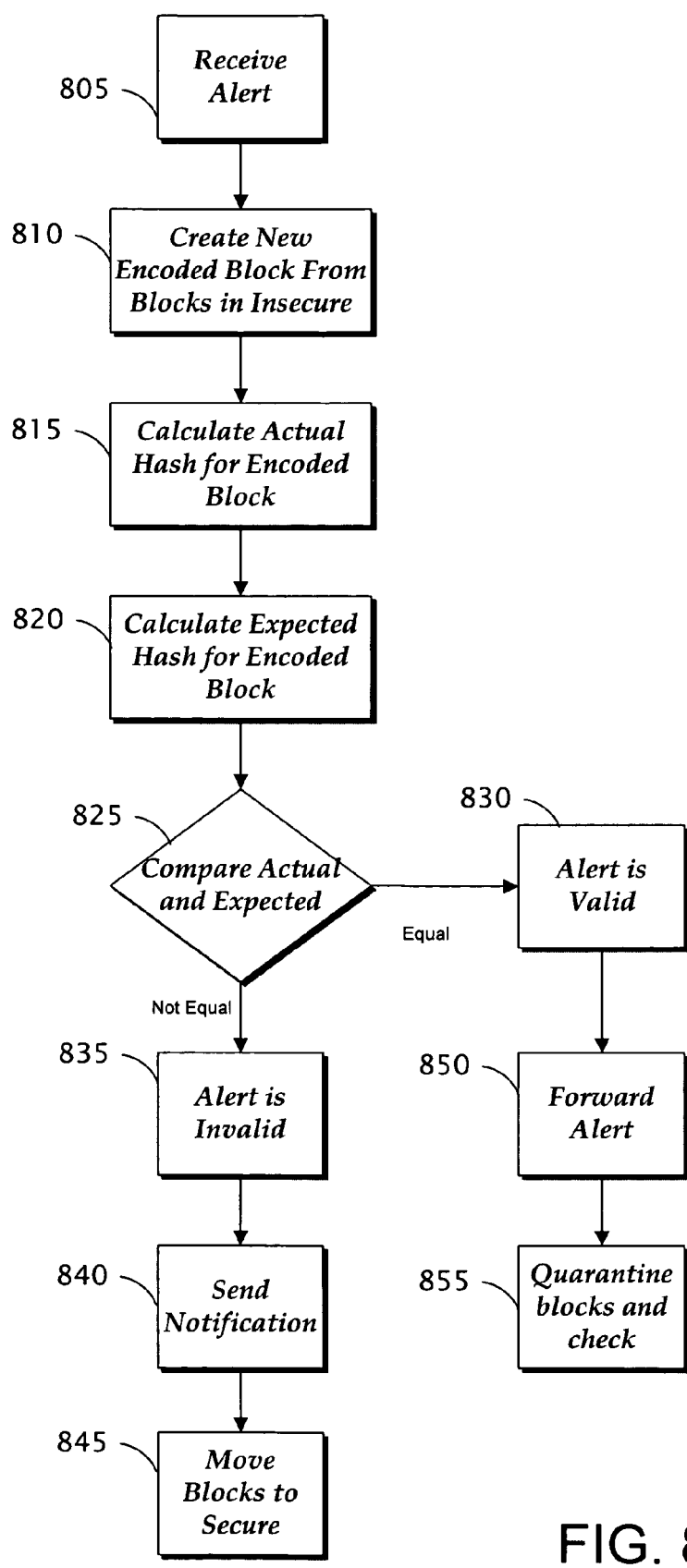
FIG. 8 shows an example processing flow in which a security alert may be received by a node in the content distribution network.

FIG. 8 shows example flow 800 which may illustrate how a node in an example security for network coding file distribution system may process a received alert.

FIG. 8 assumes the node may be attempting to download an original file from the example security for network coding file distribution system. FIG. 8 further assumes the node may have already received the security parameters for the original file and may have also received a set of random generated mask and a set of mask-based hashes corresponding to each block of the original file that will be used to verify the authenticity of the alerts.

Operation 805 may refer to a node in the example security for network coding file distribution system receiving an alert which indicates the node has stored locally at least one invalid block. This alert may be received from another cooperative node in the security for network coding file distribution system that has discovered the node has transmitted an invalid block. This alert may also have been received from a malicious node or another malicious source and may be part of a denial of service attack.

Operation 810 may refer to an operation in which the node creates a new encoded block and a new coefficient vector by performing a linear combination of one or more blocks stored in an insecure window on the node.

Operation 815 may refer to an operation in which the node applies the random hash to the new encoded block and as a result determines the actual hash of the new encoded block.

Operation 820 may refer to an operation in which the node utilizes the set of mask-based hashes and weights the set of mask-based hashes by the new coefficient vector of the new encoded block and as a result determines the expected hash of the new encoded block.

Decision 825 may refer to an operation in which the actual hash and the expected hash are compared. A determination that the actual hash and the expected hash are equal may lead to Operation 835. A determination that the actual hash and the expected has are not equal may lead to Operation 830.

Operation 835 may refer to a determination that the received alert is not valid.

Operation 840 may refer to an operation in which the node sends a notification to at least one of another node, source node, security server, or any other node that may wish to receive notification of invalid alerts in the example security for network coding file distribution system.

Operation 845 may refer to an operation in which the node moves the checked blocks from the insecure window to the secure window because the node has checked the validity of the blocks in the insecure window and determined that they are all valid.

Operation 830 may refer to a determination that the received alert is valid, and therefore, the node may have at least one invalid block stored in the insecure window.

Operation 850 may refer to an operation in which the node forwards to the alert to other interested nodes in the example security for network coding file distribution system. Other interested nodes may be the nodes that have sent encoded blocks which the node has stored in the insecure window, and may further be nodes for which the node has created and sent new encoded blocks using at least one of the blocks in the insecure window.

Operation 855 may refer to an operation in which the node may quarantine the blocks used to create the new encoded block in Operation 810 and begin an iterative validation process as discussed with respect to FIG. 7 to determine which of the blocks stored in the insecure window are invalid.

Figure 9:
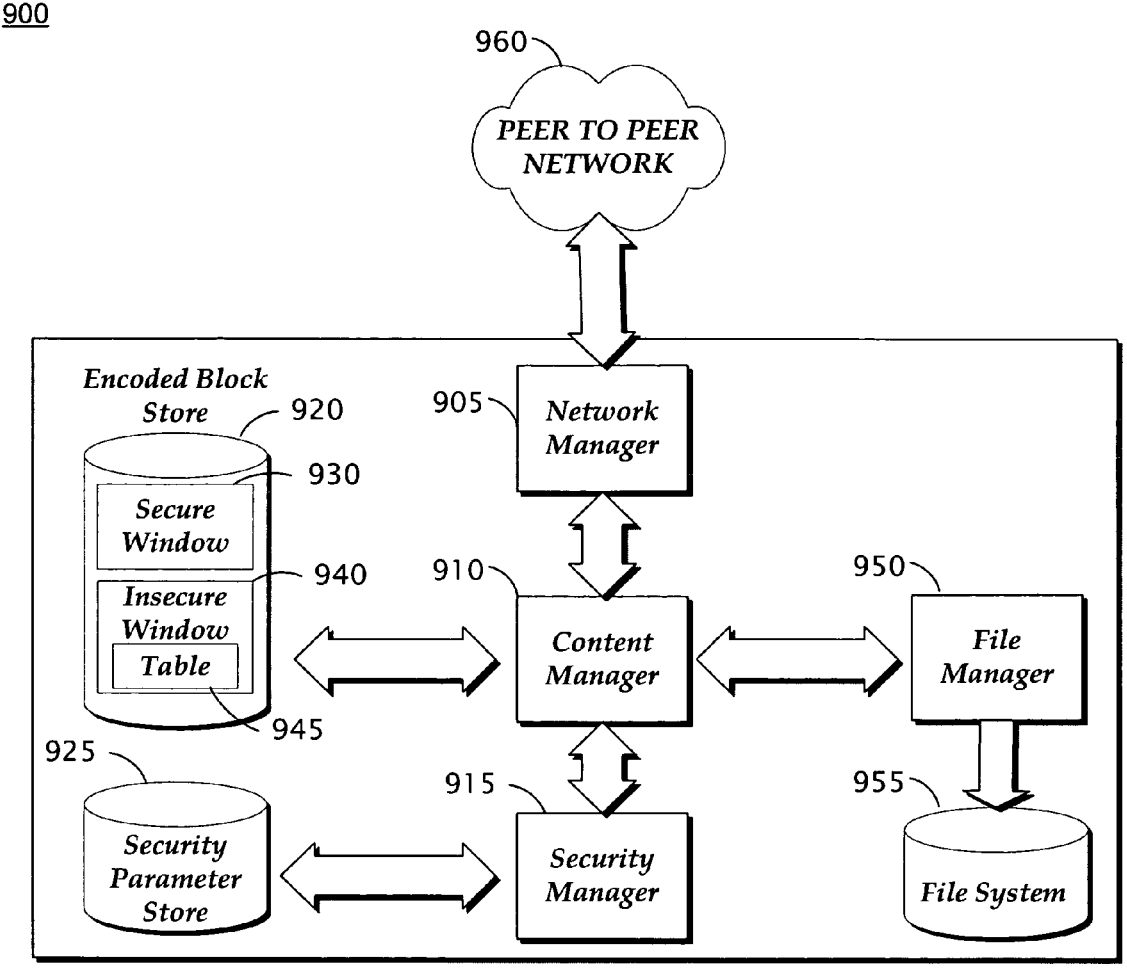
FIG. 9 shows an example system in which security for network coding file distribution may be implemented.

FIG. 9 shows example node 900 in an example Security for Network Coding File Distribution System which may be implemented in a Content Distribution Network.

Network Manager 905 may enable node 900 to communicate with other nodes, servers, devices, or the like in the Content Distribution Network. Network Manager 905 may send and receive packets or blocks of information, send or receive requests to perform an operation of any type, or send and receive other information used by node 900 to participate in the Content Distribution Network.

In communicating with other nodes on the Content Distribution Network, Network Manager 905 may correct errors during transmission, suspend and resume the sending of information to other nodes, servers, devices and the like on the Content Distribution Network, and may further verify that node 900 is permitted to participate in the Content Distribution Network. Network Manager 905 may also initiate and maintain encrypted secure connections with other nodes on the Content Distribution Network such that any communication over the encrypted secure connection may be trusted.

Network Manager 905 may further receive messages, which may include an alert that node 900 has stored invalid blocks.

Network Manager 905 may further communicate with Content Manager 910 via, e.g., an application programming interface (API), a remote procedure call over a network. Network Manager 905 may transmit blocks, information with respect to blocks stored elsewhere on the network, or information that Content Manager 910 may require for node 900 to participate in the Content Distribution Network in accordance with the aspects of the current embodiments. Network Manager 905 may also communicate received alerts to Content Manager 910.

Content Manager 910 may receive the number and size of blocks that the original file content was divided into by an origination source from Network Manager 905. Content Manager 910 may further receive blocks from Network Manager 905 send blocks using Network Manager 905, commit received blocks to Encoded Block Store 920, abort the storage of blocks that have not been received in their entirety or that have been determined to contain an error or corruption, and transfer blocks that are stored within Encoded Block Store 920 to both Network Manager 905 and File Manager 950.

Content Manager 910 may also perform at least one calculation to determine if a node in the Content Distribution Network contains innovative information that is useful to the node in decoding the original blocks into which original file content was divided by an origination node on the Content Distribution Network. If Content Manager 910 determines that a node in the Content Distribution Network contains innovative information, Content Manager 910 may communicate with Network Manager 905 and issue a request to receive the block, issue a request for the node containing the innovative information to re-encode the information and send the information, or issue another request for Content Manager 910 to function in accordance with the participation of the node in the Content Distribution Network.

Further, Content Manager 910 may also perform at least one calculation on behalf of another node on the Content Distribution Network to determine if the node contains information innovative to another node on the Content Distribution Network.

Encoded Block Store 920 includes Secure Window 930 and Insecure Window 940. Insecure Window 940 further includes Insecure-Activity Table 945. Secure Window 930 contains blocks which may have been validated by Security Manager 915. Insecure Window 940 contains blocks which may not have been validated by Security Manager 915. Insecure-Activity Table 945 contains a list with entries including an identifier of the node from which an unchecked block was received and further entries including an identifier of a node for which encoded blocks were generated using at least one of the blocks in the Insecure Window 940.

Content Manager 910 may further re-encode blocks stored within Encoded Block Store 920 using a method for the node to produce encoded blocks that are useful to other nodes in the Content Distribution Network or for the node to participate in the Content Distribution network in accordance with the aspects of the current embodiments. Content Manager 910 may choose any number of blocks from either Secure Window 930 exclusively, Insecure Window 940 exclusively, or a combination of any number of blocks from either Secure Window 930 or Insecure Window 940 to produce encoded blocks.

Deletion of blocks in Encoded Block Store 920, memory management in Encoded Block Store 920, or any operation that results in optimal operation of Encoded Block Store may also be performed by Content Manager 910.

Content Manager 910 may further communicate with Security Manager 915 via, e.g., an application programming interface (API), a remote procedure call over a network. Content Manager 910 may request that Security Manager 915 validate any number of blocks stored in Encoded Block Store 920 to determine the authenticity of the blocks with regard to the blocks being derived from the original file or piece of digital content that node 900 is seeking to download.

Content Manager 910 may also request Network Manager 905 establish a secure connection via Peer To Peer Network 960 with a security server on the Content Distribution Network or any other secure location on the network for which security parameters can be received for the original file or piece of digital content that node 900 is seeking to download. Content Manager 910 may then pass the security parameters to Security Manager 915 such that Security Manager 915 may store the security parameters in Security Parameter Store 925. In alternative embodiments, Security Manager 915 may communicate directly with Network Manager 905 to receive the security parameters directly.

Network Manager 905 may receive security alerts from Peer To Peer Network 960, the security alerts indicating that another node in the Content Distribution Network has discovered node 600 has transmitted an invalid encoded block or has been sent an invalid encoded block. Network Manager 905 may pass the alert to Content Manager 910 such that Content Manager 910 may request that Security Manager 915 undertake validation of one or more encoded blocks stored in Insecure Window 940 using method discussed in accordance with the aspects of the current embodiments.

If Security Manager 915 should discover that the alert is valid and there are one or more invalid blocks stored in Insecure Window 940, Security Manger 915 may inform Content Manager 910 of the identifier of the one or more invalid blocks, and Content Manager 910 may in turn decide to consult Insecure-Activity Table 945 and request Network Manager 905 forward the alert to the nodes indicated to have received or have been the source of invalid blocks in Insecure-Activity Table 945.

If Security Manager 915 should discover the alert is invalid, Security Manager 915 may inform Content Manager 910 and Content Manger 910 may then move the one or more blocks in Insecure Window 940 checked by Security Manager 915 to Secure Window 930.

Content Manager 910 may also determine when the number of encoded blocks necessary to decode the blocks and recover the original file has been received and are stored in Encoded Block Storage 920. Upon making this determination, Content Manager 910 may decode the encoded blocks and transfer each decoded block to File Manager 950.

File Manager 950 and Content Manager 910 may communicate using, e.g., an application programming interface (API) or a remote procedure call over a network. File Manager 950 may receive a number of unencoded blocks from Content Manager 910 and combine a number of unencoded blocks to create a copy of the original file content sent by an origination node in the Content Distribution Network.

Once File Manager 950 has combined the unencoded blocks to create the copy of the original file content, File Manager 950 may communicate with File System 955 to commit the copy of the original file to the storage capabilities of File System 955. File System 955 may represent a hard drive, a network share, non-volatile removable storage, or any physical storage medium capable of storing the copy of the original file in accordance with the aspects of the current embodiments. File Manager 530 may further communicate with an operating system, a component, an application programming interface (API), or any other device that stores the copy of the original file on behalf of the File Manager 950.

Although some particular implementations of systems and methods have been illustrated in the accompanying drawings and described in the foregoing Detailed Description, it will be understood that the systems and methods shown and described are not limited to the particular implementations described, but are capable of numerous rearrangements, modifications and substitutions without departing from the spirit set forth and defined by the following claims.

We claim:

1. A method for defeating a malicious node in a content distribution network of interconnected cooperative nodes, the method comprising:

creating a new encoded block from a linear combination of multiple encoded blocks corresponding to a file, the creating comprising:
choosing a coefficient vector;
multiplying individual values of the coefficient vector by individual byte values of individual bytes of the file; and
summing results produced by the multiplying to provide the new encoded block;

calculating, at a first cooperative node of the content distribution network, an expected hash of the new encoded block by applying a hash function to individual security parameters;

applying the hash function to the new encoded block to determine an actual hash;

validating the new encoded block based on a comparison of the actual hash and the expected hash, wherein the validating comprises verifying the new encoded block as invalid when the comparison indicates the actual hash and the expected hash are not equal or identifying the new encoded block as valid when the comparison indicates the actual hash and the expected hash are equal; and when the new encoded block is verified as invalid;
performing a search to discover at least one invalid encoded block of the new encoded block, wherein performing the search comprises: dividing individual encoded blocks of the new encoded block into sets of encoded blocks, creating newer blocks for each of the sets of encoded blocks, and verifying each of the newer blocks; and sending, by the first cooperative node, an alert regarding the invalidity of the at least one invalid encoded block to at least one other cooperative node of the content distribution network with which the first cooperative node has been exchanging blocks.

2. The method of claim 1, wherein at least one of the individual security parameters includes a random mask corresponding to the file and a mask-based hash corresponding to an unencoded block of the file.

3. The method of claim 1, wherein the individual security parameters are received from a security authority.

4. The method of claim 1, further comprising storing the individual security parameters in a secure location.

5. The method of claim 1, further comprising storing one or more of the individual encoded blocks in a security boundary.

6. The method of claim 1, wherein at least one of the individual encoded blocks represents one or more unencoded blocks corresponding to the file.

7. The method of claim 1, further comprising discarding the at least one invalid encoded block when the new encoded block is verified as invalid.

8. A method comprising:
creating an encoded block from a file, the creating comprising:
choosing a coefficient vector;
multiplying individual values of the coefficient vector by individual byte values of individual bytes of the file; and
summing results produced by the multiplying to provide the encoded block;
storing, by a first cooperative node, the encoded block in a boundary denoted as insecure;
calculating an actual hash of the encoded block;
calculating an expected hash of the encoded block using a security parameter uniquely generated for the first cooperative node;
comparing the actual hash and the expected hash;
moving the encoded block to a boundary denoted as secure when the actual hash and the expected hash are equal; and
when the actual hash and the expected hash are unequal, sending, by the first cooperative node, an alert that the encoded block is invalid to at least one other cooperative node with which the first cooperative node has been exchanging blocks.

9. The method of claim 8, wherein a homomorphic collision-resistant hash function is used to calculate the actual hash and the expected hash.

10. The method of claim 8, wherein the security parameter includes a random mask corresponding to the file and a mask-based hash corresponding to an unencoded block of the file, the mask-based hash calculated using at least one sub-block created as a result of a further subdivision of the encoded block.

11. The method of claim 8, further comprising discarding the encoded block when the actual hash and the expected hash are unequal.

12. The method of claim 8, further comprising:
creating a new encoded block corresponding to the file from the encoded block corresponding to the file, and
storing the encoded block corresponding to the file in a boundary denoted as insecure.

13. The method of claim 12, further comprising discarding the new encoded block when the actual hash and the expected hash of the encoded block are unequal.

14. The method of claim 8, further comprising receiving the actual hash of the file.

15. A system, comprising:
a plurality of nodes, at least one of the plurality of nodes being a device comprising at least one processor;
means for storing, by a first cooperative node of the plurality of nodes, security parameters related to original blocks of a file;
means for storing encoded blocks corresponding to the file;
means for creating a newly encoded block corresponding to the file from a linear combination of the encoded blocks, the means for creating the newly encoded block comprising:
randomly choosing a set of coefficient vector values;
multiplying individual coefficient vector values by individual byte values of individual bytes of the file; and
summing results produced by the multiplying to provide the newly encoded block;
means for calculating an actual hash of the newly encoded block;
means for calculating an expected hash of the newly encoded block using the security parameters and the set of coefficient vector values;
means for validating the encoded blocks based on a comparison of the actual hash of the newly encoded block and the expected hash of the newly encoded block;
means for performing a binary search to identify at least one invalid encoded block from the encoded blocks, wherein performing the binary search comprises dividing the encoded blocks into two sets of encoded blocks and verifying each of the two sets of encoded blocks, wherein the dividing and the verifying are repeatable until the at least one invalid encoded block is identified; and
means for sending an alert regarding invalidity of the newly encoded block to at least one other cooperative node of the plurality of nodes with which the first cooperative node is configured to exchange blocks.

16. The system of claim 15, wherein the encoded blocks are stored in an insecure window, and wherein one or more of the encoded blocks identified as valid are moved to a secure window.

17. The method of claim 1, wherein performing the search further comprises, after verifying each of the newer blocks, further dividing at least one newer block verified as invalid into additional sets of encoded blocks, further creating additional newer blocks for each of the additional sets of encoded blocks, and further verifying each of the additional newer blocks.

18. The method of claim 17, wherein performing the search further comprises repeating the further dividing, further creating, and further verifying until the at least one invalid encoded block is discovered.

* * * * *